United States Patent [19]

Hibshman

[11] Patent Number: 4,577,679
[45] Date of Patent: Mar. 25, 1986

[54] STORAGE SYSTEMS FOR HEAT OR COLD INCLUDING AQUIFERS

[76] Inventor: Henry J. Hibshman, 1325 Watchung Ave., Plainfield, N.J. 07060

[21] Appl. No.: 954,666

[22] Filed: Oct. 25, 1978

[51] Int. Cl.[4] .............................................. F28D 21/00
[52] U.S. Cl. ..................................... 165/45; 165/18; 60/641.2
[58] Field of Search ...................... 165/1, 2, 45, 18, 29; 166/245, 268; 60/641

[56] References Cited

U.S. PATENT DOCUMENTS

| | | | |
|---|---|---|---|
| 2,167,878 | 8/1939 | Crawford | 165/18 |
| 2,178,176 | 10/1939 | Lamm | 165/45 |
| 2,693,939 | 11/1954 | Marchant et al. | 165/18 |
| 3,262,493 | 7/1966 | Hervey | 165/50 |
| 3,878,891 | 4/1975 | Hoyt | 166/268 |
| 3,931,851 | 1/1976 | Harris et al. | 165/18 |
| 3,951,794 | 4/1976 | Swearingen | 165/1 |
| 4,074,754 | 2/1978 | Christian | 166/245 |
| 4,157,730 | 6/1979 | Desbois et al. | 165/45 |
| 4,181,468 | 1/1980 | Kent et al. | 166/26 F |

Primary Examiner—William R. Cline
Attorney, Agent, or Firm—Martha G. Pugh

[57] ABSTRACT

Systems and methods for storing heat or cold in aquifers in the form of hot or cold water, making use of one or more above-ground subsystems for collecting or utilizing the aquifer-stored heat and/or cold. A salient feature of the aquifer storage systems and methods of the present invention includes means and techniques for at least partially controlling or neutralizing the hydraulic gradients in the aquifer area.

18 Claims, 21 Drawing Figures

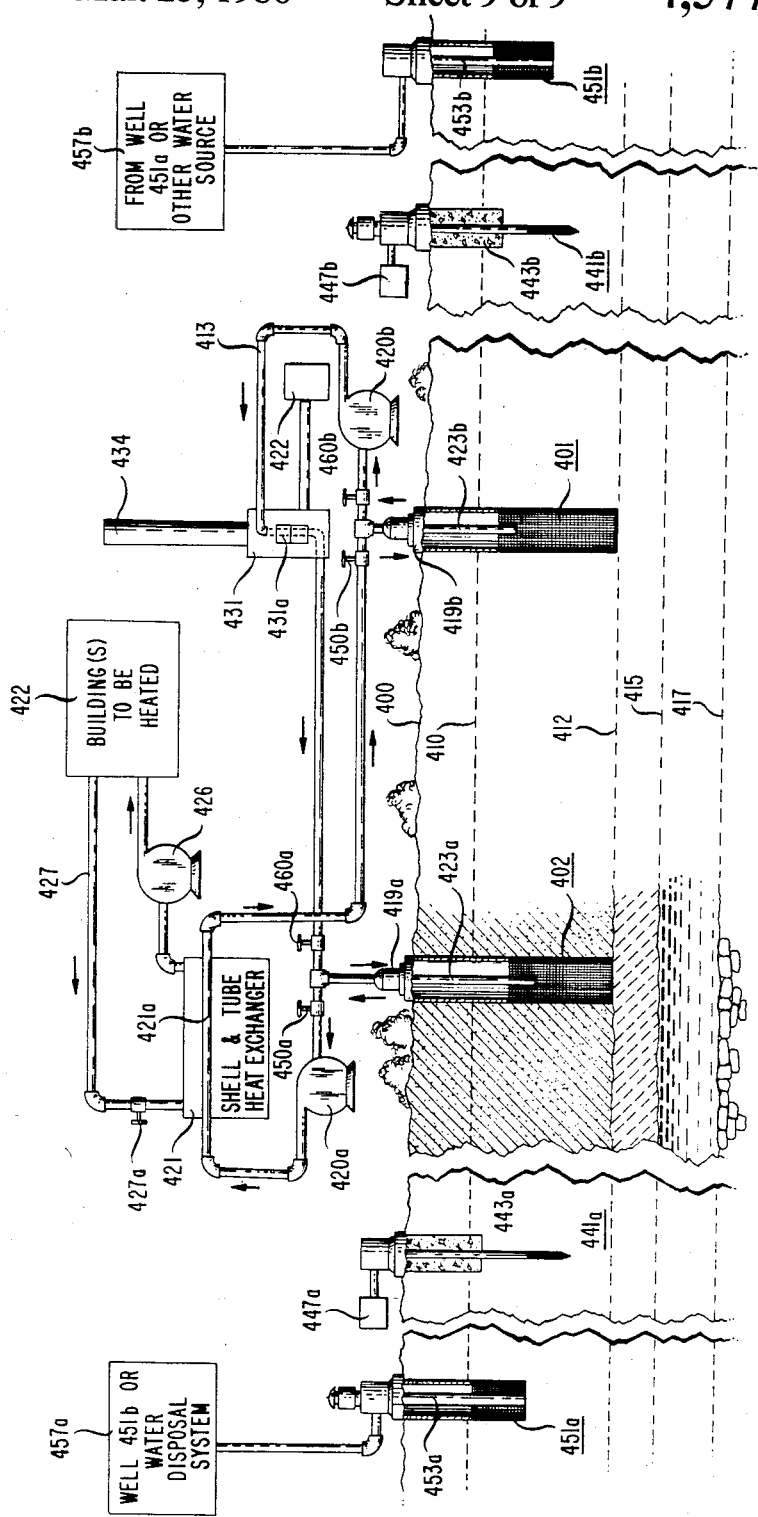

STORAGE SYSTEMS FOR HEAT OR COLD INCLUDING AQUIFERS

BACKGROUND OF THE INVENTION

This invention relates to techniques and systems for the storage of heat and cold in aquifers, and more particularly, to systems using stored heat and cold from aquifers in heat exchange with one or more heat transfer circuits.

The need for better ways of storing energy has been recognized in recent Federal legislation and government financed programs. This includes the need for better ways of storing thermal energy, and specifically, for storing solar energy, and heat and cold from other ambient sources, including waste heat from thermal and electrical generating facilities. For example in the case of solar energy, all existing solar heating and air conditioning systems for buildings require auxiliary heat sources to carry them over long periods of cloudy or extremely cold weather.

A well known expedient is the use of both large and small bodies of water for the storage of heat and cold. Thermal stratification of water is a common phenomenon with many practical uses. For example, hot water is lighter than cold water and rises to the top of tanks, lakes and even the oceans. This phenomenon prevents mixing of hot and cold water in domestic hot water heaters, and causes circulation in gravity hot water space heating systems. However it has been considered impractical to store hot water in uninsulated underground systems, as evidenced by absence of any mention of promising possibilities for so storing hot water in any of three independent studies on solar heating made for the National Science Foundation in 1973, by Westinghouse Electric Corporation, General Electric Company, and TRW Systems Group; which are respectively disclosed in the cited reports of NSF/RANN, Solar Energy grants: Numbers C-854, C-855, and C-853. None of these reports mentions the possibility of storing a free-floating layer of hot water at the upper interface of an aquifer, nor in confined aquifers.

The method of using aquifers for the storage of water underground which is subsequently retrieved and circulated for the heating of residences, buildings or building complexes, and other related entities, or for various process applications, is taught in U.S. Pat. No. 3,931,851 which issued to William B. Harris, and Richard R. Davison on Jan. 20, 1976 for Liquid Aquifer Energy Storage Method. Other U.S. patents relating to this field of art are Nos. 3,620,206 (Harris, et al 1971); 3,339,629 (Hervey, 1967); 2,693,939 (Marchant, et al, 1954); 2,780,415 (Gay, 1957); 2,584,573 (Gay, 1952); 2,007,406 (Miller, 1935); 2,637,531 (Davidson, 1953); 3,262,493 (Hervey, 1966); and the references cited in each of them. Also of interest is an article by Charles F. Meyer and David K. Todd entitled "Conserving Energy With Heat Storage Wells", Volume 7 *Environmental Science and Technology* 512 (1973).

Problems arise with the systems disclosed by Harris and others of the prior art in that they do not take into account changes in the hydraulic gradient which may occur in the area surrounding the wells; or the fact that, particularly in areas near the coast, the aquifers may be filled with salt water except for a lens of fresh water floating on the salt water. Further, on the coast and in other areas, the aquifers may be included as part of certain geological formations, such as, for example, strata sloping seaward, in such a favorable manner as to isolate the cold fresh water in a particular position with relation to the slope of the aquifer and the interface of salt and fresh water. Further, it will be apparent that there is a certain amount of seepage from ground level into the area of the storage wells, and from the area of the hot or cold water storage wells into the surroundings, or vice versa; and it is apparent that significant stored thermal energy will be lost to the atmosphere by conduction through thin layers of soil from shallow aquifers. None of these factors have been taken into account in the disclosures of the prior art, nor is there any teaching in the prior art of any techniques or systems for controlling the thermal or hydraulic gradients in the area of the wells to provide systems, the operation of which are sufficiently predictable to be of practical value in all cases.

Further problems may arise in aquifer systems because of the possibility of fouling or contamination of the natural ground water in the area by importing into the aquifer storage areas water from conduits which are open to above-ground contamination. Also, difficulties have arisen in prior art systems in controlling the energy efficiency of above-ground subsystems for collecting and/or dissipating heat and cold derived from or to be stored in the aquifers.

In this application, and in the prior art, the term 'aquifer' is defined as a water-bearing bed or stratum of permeable rock, sand or gravel capable of yielding considerable quantities of water to wells or springs.

BRIEF DESCRIPTION OF THE INVENTION

Accordingly, it is a general object of the present invention to improve aquifer systems for storing heat and cold in the form of hot and cold liquid, preferably water, and the related subsystems for collecting and/or dissipating heat and cold derived from or stored in the aquifer area. More particular objects of the invention are to monitor and control the thermal and hydraulic gradients in the aquifer storage areas. Another object of the invention is to provide an aquifer system particularly adapted to function in the geological formations peculiar to a coast-line area, and areas in which the aquifers are filled with a mixture of fresh and salt water. Another object of the present invention is to prevent contamination of the natural water in the aquifer area and to prevent fouling of the water circulating in the aquifer storage systems. Another object of the invention is to improve the heat-transfer efficiency between the heat and/or cold stored in the aquifers and the above-ground subsystems for collecting and/or dissipating the stored heat and/or cold.

These and other objects are attained in accordance with the present invention in a system for storing heat or cold in the form of hot or cold water in one or more wells which are tapped into an aquifer system, wherein means is provided for monitoring and controlling the thermal and hydraulic gradients in the storage area. One disclosed method of achieving these objectives is by surrounding a configuration of core wells which is constructed for use for storage and retrieval of hot or cold water, with a series of wells arranged in circles centered on and feeding into or out of the core wells through a system of pumps and valves for reversing flow. In one system in accordance with the present invention, a configuration of core wells, which may be used at different times and under different circumstances for the storage or retrieval of either hot or cold water, is surrounded by wells to control the hydraulic gradient. In another system, the aquifer well configuration for hot water, and the other configuration for cold water, are spaced apart in substantially separated areas, so that they are thermally and hydraulically isolated. Each of these core configurations is surrounded by a satellite system of wells, preferably arranged in concentric circles, which feed into the respective core wells and serve to control the thermal and hydraulic gradients in the areas surrounding the cores. Each of the systems is equipped with a series of pumps and valves which permit cold water to be drawn from the cold water well system and hot water to be injected into the hot water well system during the summer, the procedure being reversed during the winter.

Water in the underground aquifer storage systems is circulated through heat exchangers coupled to above-ground subsystems for utilization of the heat or cold energy stored in the aquifer systems; and for subsequently collecting heat or cold for storage in the aquifers in the form of hot or cold water.

The heat energy utilization subsystems comprise the usual hot air and hot water heating systems for servicing above-ground space heating or industrial process installations; and the cold utilization systems may comprise the usual air conditioning and refrigeration systems for space heating and industrial processes.

The heat energy collecting subsystems comprise various combinations of solar energy collectors, the use of waste heat from steam generating plants, and other waste heat sources. Devices for collection of cold comprise circulating fluid systems which are exposed to winter air in conventional cooling towers or dry coolers, or the use of near-freezing sea or other natural water, or existing refrigeration facilities in off-peak hours.

Particular features of the aquifer systems of the present invention include the storage of hot water as a free-floating layer on the surface of a body of cold water, and further means for controlling thermal and hydraulic gradients in an aquifer storage area, and for thermally and hydraulically isolating the storage area. These include means comprising interposed plastic or insulating layers for reducing the heat loss at and near the ground surface; means for preventing percolation of water into the storage areas; barriers for artificially confining the stored volume of water in certain areas of the storage systems, and for controlling the horizontal flow in different strata of the aquifer systems. Also included, are techniques for neutralizing unacceptably high hydraulic gradients by pumping or siphoning water into or out of the area from other sources. Other disclosed techniques include providing a lens of cold fresh water supported and confined for storage in a body of salt water. Salt water seepage into the aquifer system may be controlled by utilizing an injected layer of clay or other means for forming a water-impervious layer to confine the volume of water.

In one of the specific systems disclosed in accordance with the present invention, a configuration of core wells is contemplated as having a series of satellite wells for controlling the gradient. During the winter, water or other fluid is collected from a cold collecting subsystem, which may comprise, for example, cooling towers or near freezing sea water, and is either charged directly into the core well configuration for storage, or is passed through a system of heat exchangers connected to the core wells. In summer, a pump and valve system is used to reverse the flow, permitting the cold, stored water to be withdrawn from the core well configuration, and to pass through a heat exchanger coupled to the above-ground air-conditioning system.

A similar circuit is contemplated for collecting summer heat in an above-ground subsystem, which may, for example, comprise solar collectors or sources of waste heat, such as a steam generating system. Fluid, so heated, is either directly passed into the core wells for summer storage, or passes through a heat exchanger which warms water for storage in the core wells. For winter heating, the process is reversed. In each of these cases, the water returning from the above-ground subsystem, or from a heat-exchanger connected thereto, is charged into one or more satellite wells to control the hydraulic gradient, which may also be controlled by siphoning or neutralizing techniques, such as mentioned above.

Another possible system in accordance with the present invention may include both a configuration of hot water core wells and a configuration of cold water core wells, together with separate systems of satellite wells, to control the thermal and hydraulic gradients in the aquifers forming a part of each well system. A system of valves is provided for completely reversing withdrawal of water from one core well system and injection of water into the other core well system. In the winter, stored hot water may be withdrawn from the hot water core wells for use for heating purposes, whereas near freezing water from the cold-collecting subsystem is injected into the cold water core wells. In the summer, the process is reversed; and water is withdrawn from the cold water core well for use for air conditioning and/or refrigeration; and hot water from waste heat sources and the air-conditioning or other waste heat sources is injected into the hot core wells.

The heat transfer efficiency of all of these systems is enhanced by heat pump systems which operate in heat exchange relationship with a reversible closed-circuit system from the wells, so that the water from the aquifer system does not come in actual contact with the user or collector systems.

Certain terms, as used in the specifications and claims hereinafter, will be defined as follows:

Core Wells: are wells in which hot or cold water is stored.

Satellite Wells: are the peripheral wells into which hot or cold water, which has been used, is injected for storage until the next reheat or recooling cycle of the well system.

Multi-Use Wells: are wells always located within the peripheral enclosure defined by the satellite wells, which are used alternately as core and satellite wells.

Monitor Wells: are wells equipped with temperature and/or water level sensing devices; they may be independent wells or incorporated as part of core, satellite and multi-use wells.

Control Wells: are wells located outside of the peripheral enclosure defined by the satellite wells, which are used solely for neutralizing natural hydraulic gradients.

Other objects, features and advantages of the invention will be understood from the detailed description hereinafter with reference to the attached drawings.

SHORT DESCRIPTION OF THE DRAWINGS

FIGS. 7, 8, 9, and 10 show a number of variations of underground thermal storage systems, in accordance with the present invention, including different techniques for controlling surface seepage and hydrological gradients.

Figure 11:
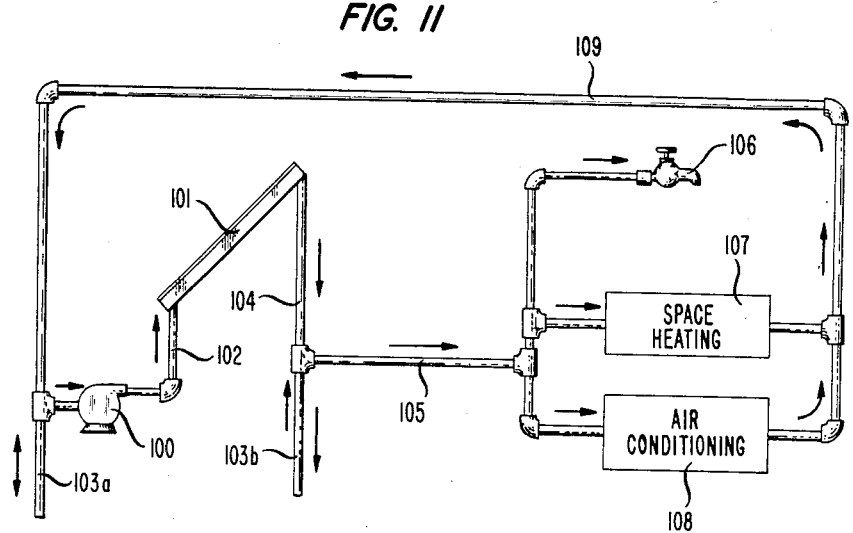

FIG. 11 shows a solar subsystem for heating the water to be stored in the aquifer systems in accordance with the teachings of the present invention.

Figure 12:
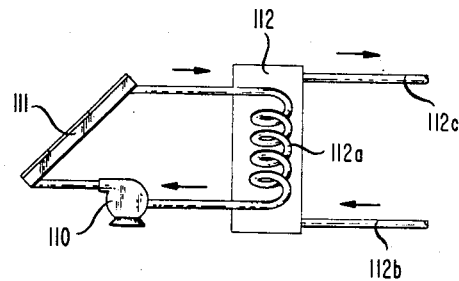
Figure 13:
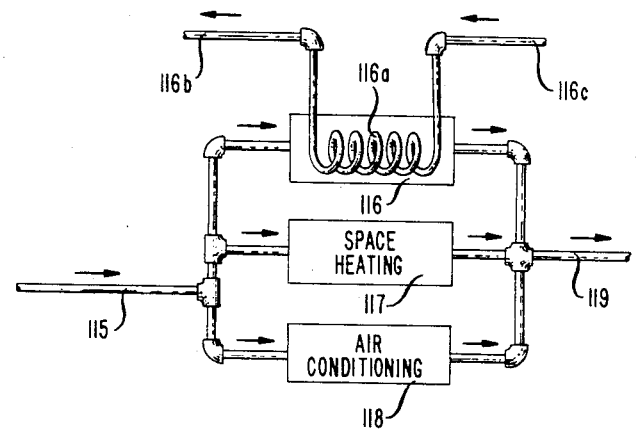

FIGS. 12 and 13 show variations of the component parts of FIG. 11 which employ closed-loop circuits which pass through heat exchangers serviced by hot or cold water from the underground storage system.

Figure 14:
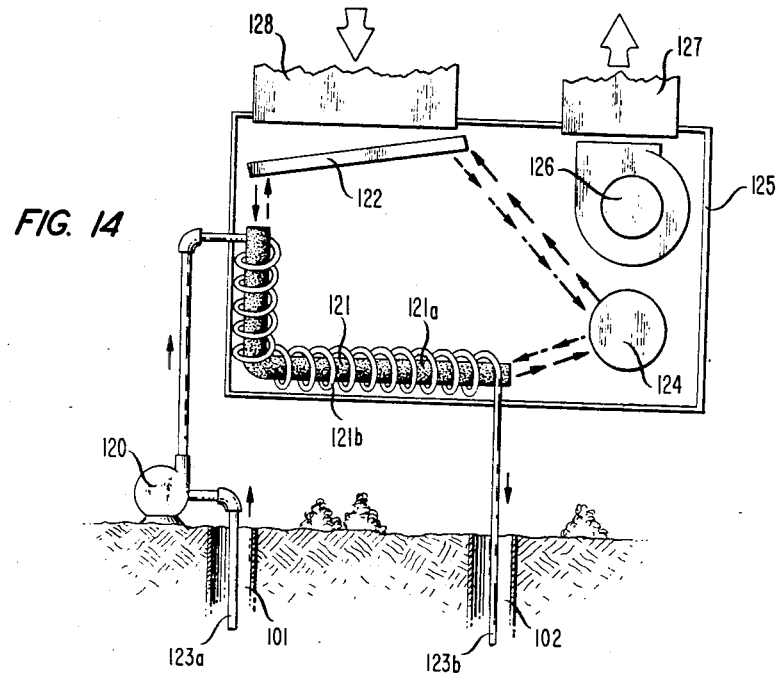

FIG. 14 is a schematic diagram showing a system of the present invention employing the heat pump principle for winter heating or summer cooling cycles of operation, depending on the flow direction.

Figure 15:
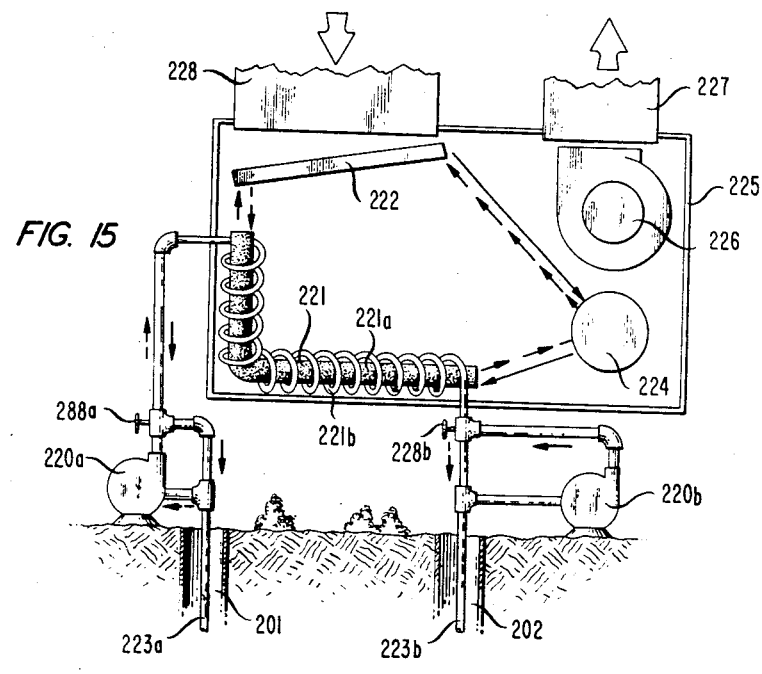

FIG. 15 shows, in schematic, a heat-pump system in accordance with the present invention, including a pump and valve system, for reversing the flow to and from the aquifer for the heating and cooling cycles shown in FIG. 14.

Figure 16:
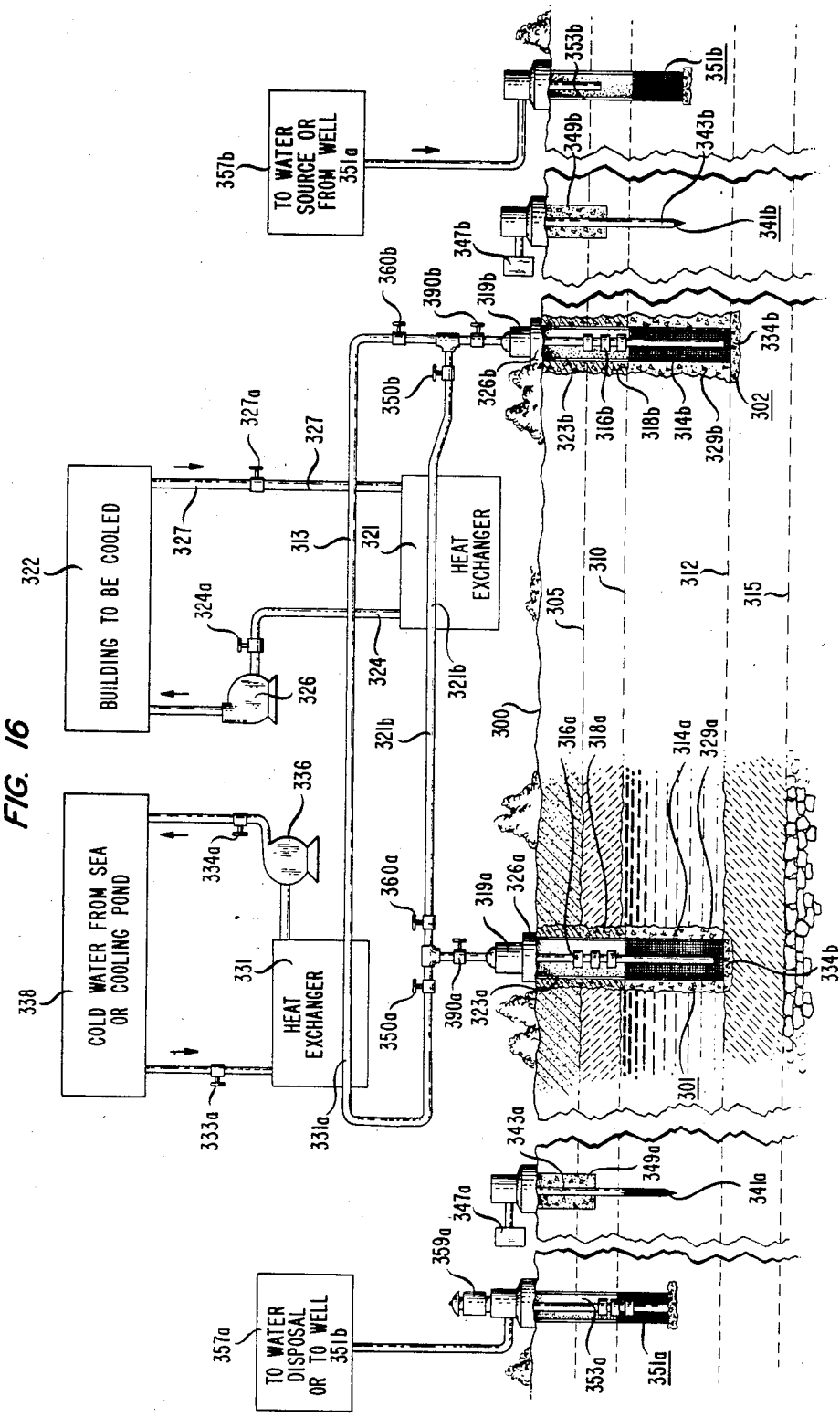

FIG. 16 shows a schematic diagram of one example of a cooling system in accordance with the present invention proposed for a large complex of buildings, which system comprises an above-ground fluid chilling circuit for supplying cold water during the winter for well storage in a hydraulically controlled environment, which is subsequently used for summer cooling.

Figure 17:
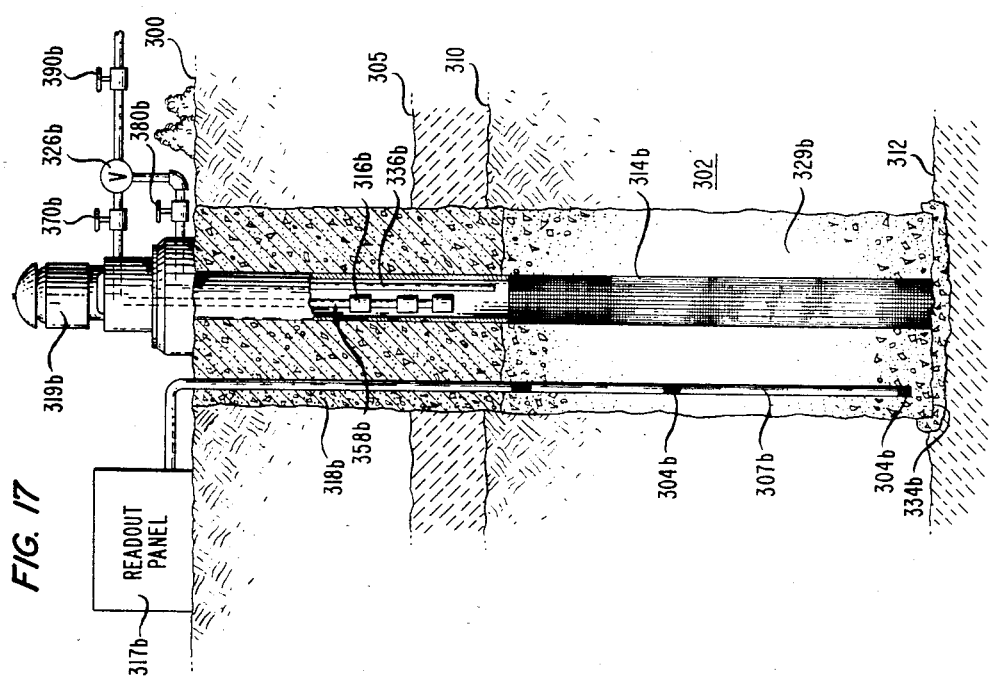

FIG. 17 is a showing, in detail, of the constructions of a typical well for the system of FIG. 16, including temperature monitoring means.

Figure 18:
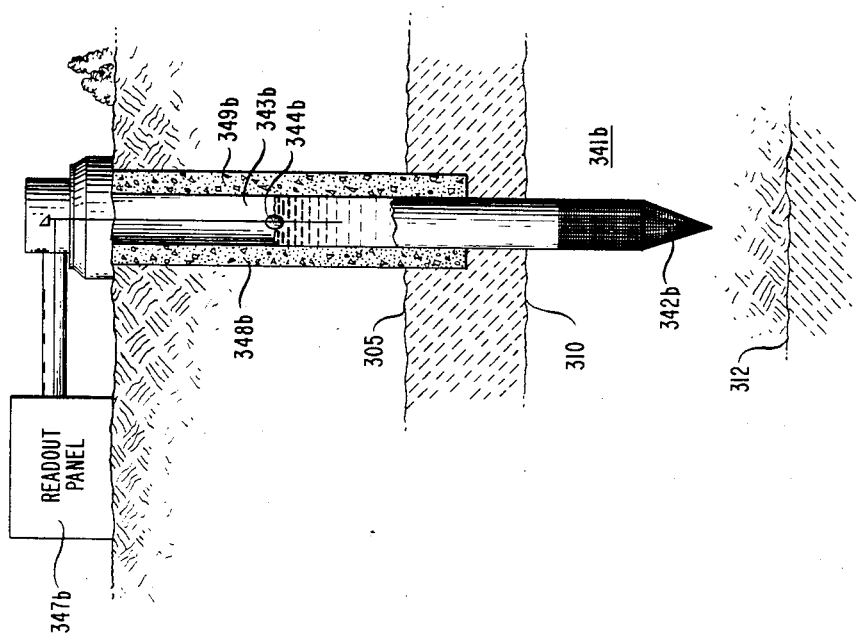

FIG. 18 is a showing, in detail of a typical level monitor well of the type to be used to control the hydraulic gradient in the system of FIG. 16.

Figure 19:
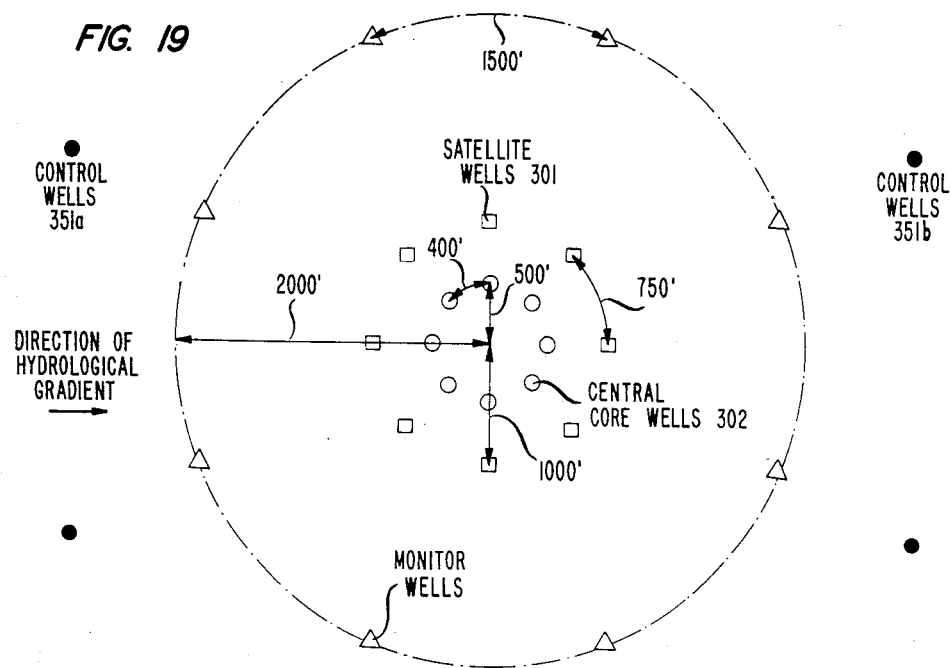

FIG. 19 shows a simplified configuration of injection and control wells to be used in connection with either of the systems of FIGS. 16, or 21.

Figure 20:
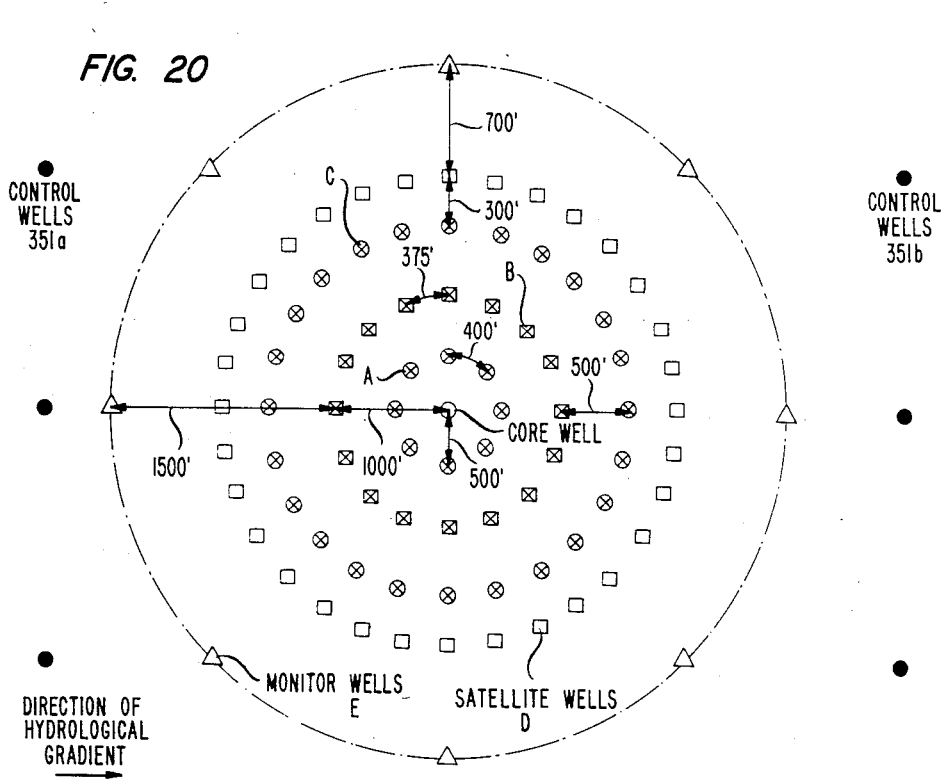

FIG. 20 shows another, more complex well configuration, to be used in connection with either of the systems of FIGS. 16 or 21.

FIG. 21 shows a schematic diagram of an example of a heating system in accordance with the present invention, also proposed for a large complex of buildings, which employs an above-ground hot-water steam circuit including exhaust steam from electric generators, which supplies hot water during the summer for well storage heating in a hydrologically controlled environment, which is subsequently used for winter heating.

DETAILED DESCRIPTION OF THE INVENTION

Figure 1:
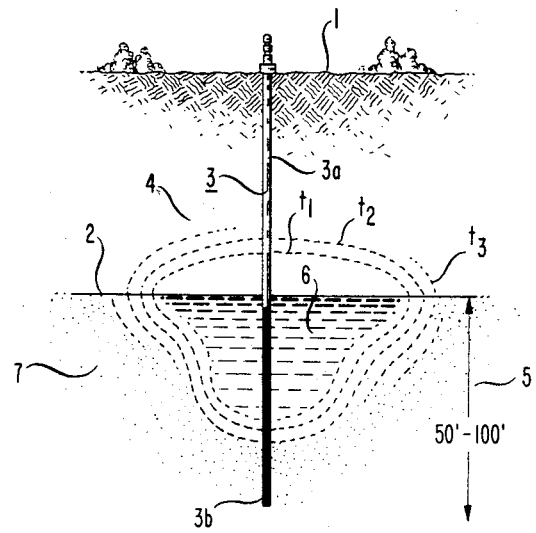
FIG. 1 illustrates the general hydrological relationship involved in the storage of hot water as a free-floating layer in the upper zone of an aquifer.

Referring in detail to the drawings, FIG. 1 indicates the general hydrological relationship including a schematic showing taken through a vertical plane, in which 1 indicates the land or soil surface. At a level, preferably 20 to 100 feet below the land surface 1, is the top of a water table or confined aquifer 2. Interposed vertically into the surface 1, and extending down to just below the water surface, is a well casing 3 containing one or more pipes 3a for introducing water into and withdrawing water from the storage zone 4 through openings at a multiplicity of levels in a well screen 3b, which comprises an extension of the well casing 3a. Zone 4, which may, for example, comprise layers of sand, clay, or other material, overlays an aquifer 5 having a minimum thickness of between 50 and 150 feet. The latter is characterized by a hydraulic gradient producing a natural hydrological flow of water. Surrounding the well screen 3b, at the lower end of the well pipe, is an internal hot core 6 or thermal storage zone. This is surrounded by area 7 which inherently comprises earth insulation of the hot core 6. The natural hydrological pressure causes expansion and contraction of zone 6 and the surrounding temperature zones t1, t2, t3, etc., as the hot water is introduced into or withdrawn from storage, thereby causing boundaries of each of the thermal gradient zones to wax and wane. As this occurs, the level at which water is introduced into or withdrawn from the well is raised or lowered by means which will be apparent from the following illustrations.

Figure 2:
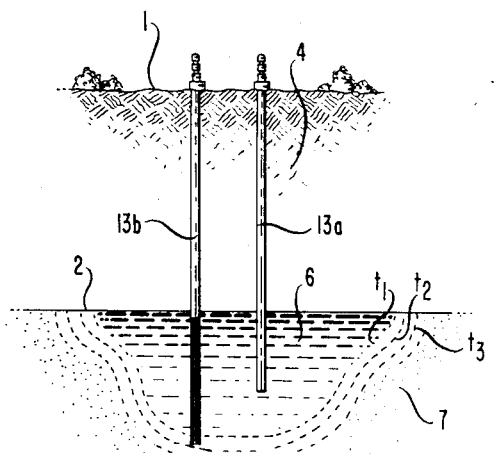
FIG. 2 shows a simplified arrangement in accordance with the present invention in which hot water is introduced into and withdrawn from a relatively shallow well.
Figure 3:
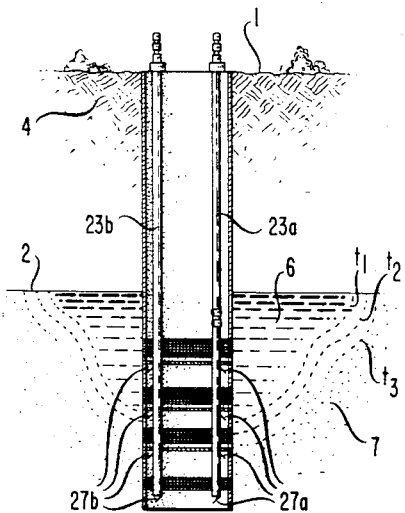
FIG. 3 shows an improved system in accordance with the present invention in which a well casing, attached to a long partitioned screened section includes two muliport inner pipes having automatic valves which permit the introduction of hot water and withdrawal of cold water from optimal temperature zones.

FIGS. 2 and 3 illustrate some of the different ways for charging hot or cold water into the aquifer and withdrawing hot or cold water therefrom. The simplest arrangement uses at least two wells screened to different depths, the hot or cold water being introduced or withdrawn from the shallower core well 13a, and warm or cool water being introduced into or withdrawn from the deeper satellite well 13b.

FIG. 3 shows an arrangement in which the overall heat efficiency is improved. This is obtained using at least one long casing which is screened and partitioned and which contains two multi-port inner pipes, 23a for hot water and 23b for cool water. A plurality of automatic valves 27a and 27b, respectively, permit introduction of hot water into the optimal temperature zones and withdrawal of cooler water from correspondingly lower optimal temperature zones surrounding the pipe complex. In systems of the concentric types to be described hereinafter, plural pipes are not used; but use of one pipe and partitions may have advantages in controlling flow in aquifers comprising layers of significantly different permeability.

Figure 4:
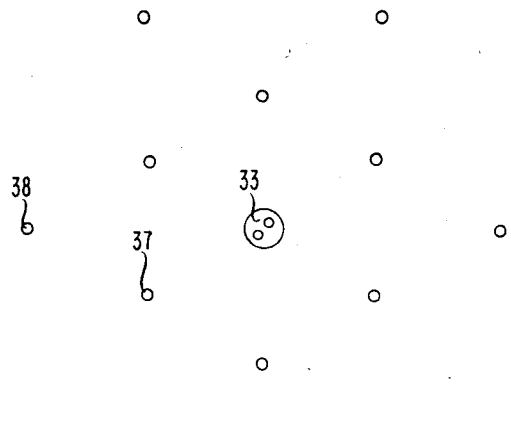
FIG. 4 shows a configuration of improved efficiency, in accordance with the present invention, comprising one or more rings of wells with single pipes, or alternatively, having single or multiple ports and partitions, surrounding a central hot core, or a central cold core.

In accordance with the present invention, maximum control of the overall efficiency of the well system is obtained using one or more rings of wells with single or dual pipes, with single or multiple parts, such as screens, and partitions surrounding the hot core in a configuration such as that shown, for example, in FIG. 4 of the drawings, in which 33 represents one or more central or core wells which are of the form, for example, indicated in FIG. 3, and which are surrounded by a plurality of satellite wells in one or more of rings 37 of intermediate diameter and neutralizing or control wells 38. Alternatively, it is contemplated that the center or core wells can be arranged in one or more lines, flanked by one or more lines of satellite and neutralizing wells.

I have further investigated the possibility of storing free-floating layers of hot water on the surface of aquifers from a fundamental technological standpoint and regarding its applicability generally throughout the United States of America. Aquifers of sufficient size at suitable depths are not generally present; and when they are present, losses of heat by conduction and water movement usually create serious, if not insurmountable, problems.

To my surprise, I discovered that when I use an unusual combination of four specific, favorable conditions, my system provides a particularly satisfactory method for storing hot water for long periods of time. In fact, I have discovered that it is possible to store very large quantities of water at high temperatures, not only from one day to another, but from one season or year to another. This approaches a technological breakthrough in such cases as solar heating where there is no known method of economically storing enough heat to span long periods of cloudy or extemely cold weather. This principle can also be applied to the storage of winter cold for summer use. Further, my discovery will also be useful in storing off-peak energy from power plants and other large heat generating facilities on a daily, weekly or seasonal basis.

The following table lists the specific conditions which I have discovered should preferably be combined in order for my invention to be successful in a practical and economic sense.

Table 1

1. The depth to the water table or aquifer must not be too great or small. If the depth is less than, say, ten to twenty feet, heat loss will be excessive. Drilling costs rule out deep water tables.

2. Movement of water into and out of the aquifer in natural currents through the storage volume must be minimal. Depending upon the size of the system, flows of more than about five to twenty feet per average residence time of the water in storage will result in excessive losses of hot water and dilution with cold water.

3. The aquifer must have a sufficient thickness within a uniform and highly porous strata. Depths of about twenty to forty feet or more are necessary to store practical amounts of water without excessive heat losses by conduction vertically to other strata.

4. The porosity of the aquifer must be of a quality suitable for producing well water at above average rates and must have a uniformity such that severly striated flow patterns do not occur.

5. The energy supply and demand parts of the overall system must both be sufficiently large so that the required thermal storage volume is large enough to make combined heat losses a small percentage of the heat input to storage.

In some practical situations one or more of the foregoing conditions may not be favorable. In such cases I have found that the following compensating improvements can be used as appropriate.

Table 2

Permeability barriers, such as wood, metal or plastic, may be used to reduce movement of water within the aquifer, or to form a vertical enclosure around the hot zone, particularly in water table aquifers near the ground surface.

Insulation may be used to reduce heat loss from the storage zone, particularly in shallow aquifers where overheating of building basements and ground surfaces would occur.

Water may be pumped out of the upstream border of the storage zone and introduced into the downstream border zone to minimize differences in hydraulic heads which otherwise promote movement of water through the storage zone. Alternatively water from other surrounding areas may be introduced into the downstream side of the border zone. A third alternative is to allow upstream water to bypass the hot zone through siphon and/or underground drainage-type conduits.

Where the hot water in the storage zone is exposed to dilution with cold rainwater seeping into the soil, artificial barriers to infiltration may be placed on top of or buried in the soil over the storage area.

When the temperature level of the hot water supply or the temperature level of the water needed to be withdrawn from storage vary from one time to the next throughout the day, week or season, it is possible to increase the efficiency of the overall system by introducing and/or withdrawing water at optimum locations within the storage zone. As a fair approximation, the optimum location is where the water in the storage zone is at the same temperature as the water entering or needed for withdrawal use. The hottest stored water will always be surrounded by shells, or zones, of progressively cooler water as the distance from the hotest zone increases, as shown by the dotted lines labelled t1, t2 and t3 in FIGS. 1–3.

The following illustrate multidimensional engineering calculations for the site of a typical storage subsystem:

A Large Hot Core Is Required For A Typical House

| Heat Storage Period | Diameter of A Spherical Storage Zone: Feet | |
|---|---|---|
| | N.J. House | Typical-Ohio House |
| 1 Week | 17 | 13 |
| 1 Month | 28 | 22 |
| 6 Months | 50 | 39 |
| 1 Year | 50 | 39 |

1 Month is considered desirable, and 1 year results in minimized collector investment.

An Insulating Earth Shell Cuts Core Heat Loss

Large savings result with shell thicknesses up to 20 to 50 feet. Additional thicknesses of even a mile save little more.

| Thickness of Earth Shell Around Hot Core: Feet | Typical Heat Loss From Core Maintained at 200° F.: BTU/Hr. | |
|---|---|---|
| | Core Dia.: Ft. | |
| | 32 | 64 |
| 3 | 140,000 | — |
| 6 | 68,000 | — |
| 12 | 44,000 | 140,000 |
| 24 | 30,000 | 84,000 |
| 48 | 24,000 | 60,000 |
| 96 | 22,000 | 49,000 |
| 1 Mile | 18,000 | 36,000 |

The following calculations show that high storage efficiencies are only possible with large cores:

| Heat Loss From Core: % of Stored Heat At 200° F. For Indicated Time | Hot Core Diameter: Feet (with 40 Ft. Thick Shell) Time | | |
|---|---|---|---|
| | 1 Month | 6 Months | 1 Year |
| 200 | 8 | 22 | 32 |
| 100 | 13 | 32 | 50 |
| 50 | 18 | 48 | 80 |
| 25 | 25 | 78 | 140 |
| 10 | 40 | 150 | 230 |
| 5 | 65 | 240 | 400 |

Large heat users are also favored by the high heat consumed initially and the long times required to heat shells for small cores. Assuming that the solar collector subsystem is not overdesigned for long term operation, both startup heat and startup time will be roughly proportional respectively to heat stored in the core and storage time as shell volume is to core volume.

| Core Diameter: Ft. | Ratio: Shell Vol. Core Vol. (40 Ft. Thick Shell) | Warmup Time: Years (For Storage Vol. = One Year's Heat Usage) |
|---|---|---|
| 30 | 100 | 50 |
| 60 | 25 | 12 |
| 100 | 5 | 2.5 |
| 200 | 1.7 | 1.0 |
| 300 | 0.42 | 0.25 |

Thus, for overall economy it appears that a group of, say, 25 to 60 dwelling units or large shopping centers or factories would be ideal users.

I have further discovered that it is possible to modify the central wells shown in FIGS. 2, 3 and 4 in a manner to increase their operating efficiency in those special situations which involve aquifers having both fresh and salt water.

Figure 5:
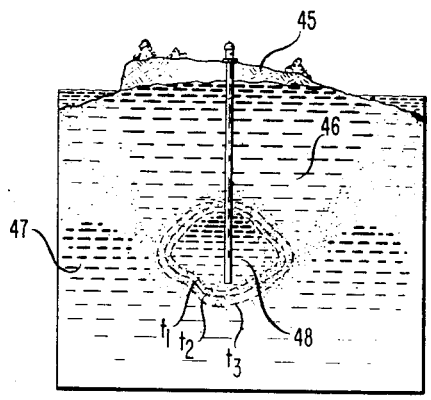
FIG. 5 shows a special geological configuration existing beneath many islands, and particularly barrier beaches on Long Island and the coast of New Jersey in which the aquifers tend to be filled with salt water, except for a lens of fresh water floating on top of the body of salt water.

One special type of situation illustrated in FIG. 5 frequently occurs on land, which is wholly or mostly surrounded by salty water 47, such as small islands, including barrier beaches and on narrow peninsulas or isthmuses 45. In such cases the aquifer is filled with salt water except for a lens of fresh water 46 floating on the salty water 47, at the surface of the aquifer. If cold fresh water were introduced into the bottom of the aquifer, the fresh water would tend to rise and the system could be inefficient, if not inoperable. Similarly, if cold water were fresh and introduced at the surface of the fresh water lens 46, the cold water would tend to sink, again causing inefficiency or inoperability. In such situations I have found that it is necessary to locate the storage volume 48 at the depth where the density of the aquifer water is the same as that of the cold water to be stored. This optimum depth is not necessarily the interface between fresh and salty water, because there is often an intermediate zone of brackish water wherein the density increases very gradually from that of fresh water to the density of sea water. Also, in regions of sparce rainfall and/or excessive run-off such as is approached in highly developed areas, such as on Coney Island and Atlantic City, the fresh water lens 46 may be extremely thin or absent and the salty water is at sea level under the land. In such cases, the cold water will float on the surface of the salty water table in a satisfactory manner. When the cold water to be stored is obtained by withdrawing and chilling water from the aquifer, the systems depicted in the previous figures must be modified to avoid withdrawing salty water which would introduce corrosion problems and upset the density balances. The recirculating water would be withdrawn from above or aside of the storage core. When the aquifer contains no fresh water or insufficient fresh water, fresh water may be imported; or salty water of intermediate density may be used. Imported fresh or slightly salty water may be used to adjust the density of waters of higher salt content.

Figure 6:
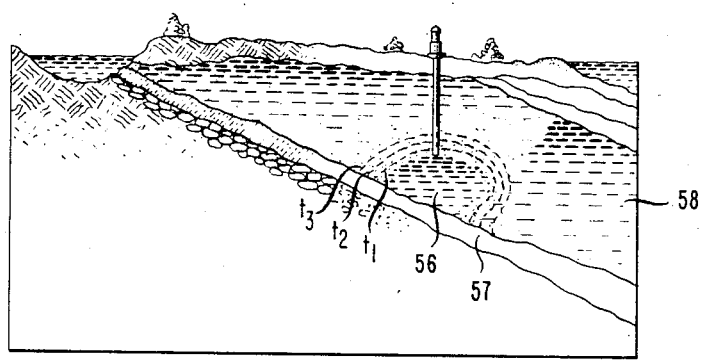
FIG. 6 shows a second type of geological configuration existing in many coastal areas in which fresh water in a seaward sloping aquifer meets salty water on the landward side of the coastline.

A second type of situation, illustrated in FIG. 6 exists along coastal aquifers where fresh and salty waters meet. A particularly favorable situation exists where a seaward slopeing aquifer meets salty water on the seaward side of the coastline. Such a condition exists along the sea coast of Long Island. In this case, the cold storage volume 56 is located appropriately within the bottom of the valley 57 formed by the bottom of the aquifer, and the higher-density salty water 58 which confines the cold water within the valley bottom. It is not always necessary to have the bottom of the aquifer slopeing seaward, since the natural movement of ground water is usually seaward, thus tending to pile the cold water against the salty water. Under some such conditions the bottom of the aquifer could actually slope in the opposite direction.

When storing cold water, it is sometimes desirable to use one or more of the inventions previously described. I have found that it is particularly useful to use a variation of the satellite system shown in FIG. 4, which variation consists of extending the neutralizing wells all the way to the bottom of the aquifer, particularly when the cold water is in contact with the bottom of the aquifer; and at least extending the neutralizing wells to the general level of the bottom of the cold water storage volume in cases where the cold water floats on salty water. Individual neutralizing wells may be isolated or manifolded together at the top in any appropriate way to most effectively neutralize hydraulic gradients at the storage volume. The wells may be divided into vertical zones as illustrated in FIG. 3 and/or arranged in horizontal sequences as illustrated in FIG. 4.

I have also discovered a method for neutralizing and/or reversing hydraulic gradients which is particularly useful along ocean and estuary shorelines or along the shores of large lakes and wherever there are static water levels as the aquifer approaches ground surface such as in the case of tidal waves. It may consist of a series of neutralizing wells such as described with reference to FIG. 4, and/or as modified above, or, as discussed elsewhere. The wells on the upstream side of the underground water movement are so placed that they are subjected to submergence and emergence in tidal water. The wells may contain manually or automatically opened and closed valves between high and low tide levels, including float-operated valves. This method is particularly useful on islands, peninsulas and isthmuses where shores surround all or most of the storage volume. However, where, as is usually the case, the high hydraulic heads are on the inland side of the storage site, and in non-tidal situations, well heads may discharge into drainage ditches or burried drain pipes which are appropriately positioned at elevations to discharge by gravity. In tidal situations, the valves on the high hydraulic head side of the storage volume are opened only when the tide drops either below the height of the valves or below the hydraulic level in the wells. This timing of valve opening permits water to flow out of the wells under artesian pressure, thus tending to correct the hydraulic gradient without pumping. If necessary, the valves on the low hydraulic head side of the storage volume may be opened when the tide is either above the valves or above the hydraulic head level in those wells. Thus, sea water which must be adequately filtered in order not to plug the wells, will flow into the wells and help neutralize the gradient. It is apparent that wells on the offshore side may actually be located on shore above high tide levels. When the inland wells must penetrate high ground, the wells may be connected to appropriate lower drainage levels by siphons extending below low tide, or the siphons kept from breaking by appropriate traps. Use of siphons in this way permits neutralizing underground flow at static water levels up to not more than about 33 feet below the land surface. Pumps may be used to remove any air or other gases accumulating in high points of the piping. The wells may be operated independently or they may be manifolded so that controls are only needed on the manifold outlet itself.

I have also discovered that siphon systems to neutralize hydraulic gradients far inland from shore lines, such as described hereinafter with reference to FIG. 10, can be made to respond much more rapidly when the down grade end of the siphon is positioned at levels significantly lower than those required to sustain flow, as will be discussed presently.

Figure 7:
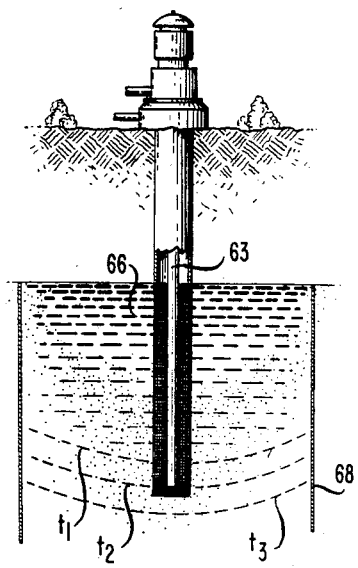

FIGS. 7, 8, 9 and 10 illustrate variations of thermal storage systems in accordance with the present invention. As shown in FIG. 7, a barrier 68, which may comprise, for example, a cylindrical shell of wood, metal, plastic, etc., driven into or burried in the ground, having a diameter, say at least about 20 feet (7 meters), may be used to confine a core 66 of hot water. This arrangement is particularly useful for confining water stored under a builing in an area in which the water tables are shallow, and/or an area in which there is a substantial horizontal movement of natural water in a shallow aquifer. This facilitates maintaining a compact storage core by eliminating horizontal migration which would otherwise occur as idicated by hypothetical lines t1, t2, etc. Heat loss from the core can be reduced by use of insulating materials in the barrier 68.

Figure 8:
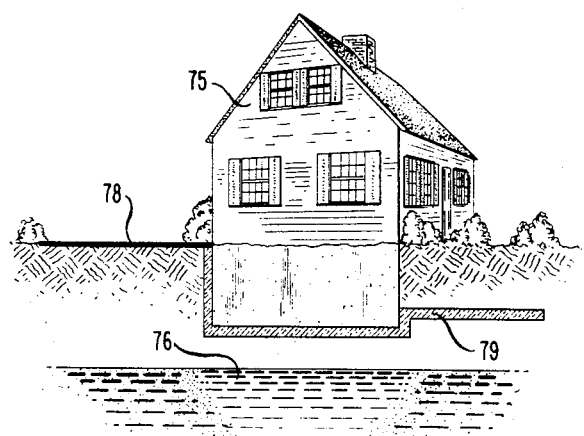

Another expedient is illustrated in FIG. 8, in which insulating means, either at the surface, or under the building 75, may be applied in such a manner as to minimize heat loss and avoid excessive upper temperatures in areas having shallow water tables. This may take the form, for example, of a surface layer 78 of asphalt pavement over a layer of clear gravel, and an underground layer 79 of, say, fire brick insulation, or ay other well-known type, having a thickness of, over, say about 2 inches (5 cm.), which is interposed between the basement floor of the building 75 and the hot water storage zone 76.

Location of storage zones under buildings, parking lots and streets reduces dilution of stored hot water with infiltrated rain water. Where necessary, any suitable material, such as plastic film may be placed to form an artificial barrier to infiltration, on or under the soil surface.

Figure 9:
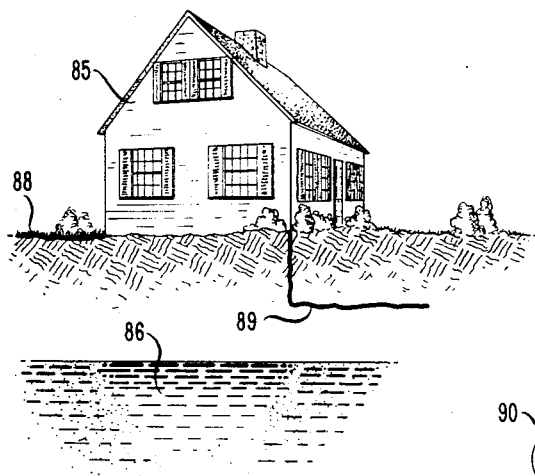

For example, FIG. 9 shows another modification in which a water-impervious sheet of plastic, such as, for example, low density polyethylene, is either placed at ground level 88, or at a level 89, a few inches, or a few feet below the surface of the ground, but above the stored water level, and covered with a layer of natural ground cover, such as flowers, grass and trees. This protects the stored core of hot water from ground seepage.

Figure 10:
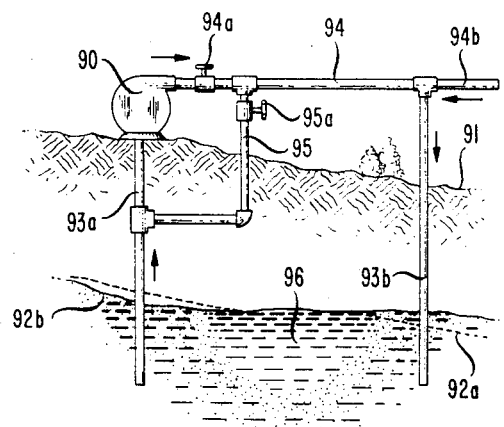

In accordance with another modification, shown in FIG. 10, unacceptably high horizontal hydraulic gradients in a storage zone are neutralized by recharging water on the downstream border of the storage zone. Recharge water may come from another region, or may be pumped or allowed to flow by gravity (or siphon means) from the upstream border of the storage zone.

Referring to FIG. 10, a pump 90, which may be, for example, from about ¼ to 5 horsepower, is coupled to the well casing 93a for pumping up water from the upstream side of the hydraulic gradient, which is forced through the open valve 94a into the coupling pipe 94, which is connected to injection well casing 93b, permitting water to be pumped back into the water table at a lower level, thereby changing the hydraulic gradient surrounding the hot water core 96 from that indicated by the dotted line 92a to the new, less steep gradient indicated by full line 92b. As an alternative to operating pump 90 continuously, when valve 94a is closed and valve 95a is opened, the by-pass 95 serves to syphon water from well including casing 93a without the aid of the pump. Alternatively, water may be obtained from a source outside the area or from the storage wells and introduced through pipe 94b into injection well casing 93b. A third alternate substitutes an infiltration pit, ditch or dry-well for the injection well including casing 93b.

FIGS. 11, 12 and 13 illustrate several variations of solar subsystems which can be used in combination with the aquifer storage systems of the present invention. The simplest design of a subsystem for hot water and space heating and cooling in accordance with the present invention is shown in FIG. 11, in which all heat exchangers and tanks are eliminated. This system, or its variations, is particularly applicable in those areas in which aquifer water is of high quality, and there is no serious freezing problem in the solar collectors.

In the system disclosed in FIG. 11, the solar collector 101 may be of any of the types well-known in the art, of which there are many. Illustrative systems which may be suitable for the purposes of the present invention are those disclosed in U.S. Pat. No. 1,258,405, issued to D. A. Harrison Mar. 5, 1918; No. 3,952,725, issued to William B. Edmundson Apr. 27, 1976; and No. 3,965,887, issued to E. J. Gramer and M. O. Johnson, June 29, 1976, each of which is incorporated herein by reference. The solar collector system 101 is mounted on the roof of a building, or in other area exposed to solar radiation, preferably at such an angle and orientation as to receive the maximum possible radiation. A pump 100, which may have a horesepower of, for example 10 to 100, is interposed into a system of conduits connected between the pipes 103a and 103b leading out of and into aquifer wells of the types described in the preceeding pages, which may take the form, for example, of that shown in FIG. 17 hereinafter. It will be understood that if a pump is present underground in the well system, 100 may be omitted.

The pipe 103a is connected to channel cool water to and from an aquifer well or well series, whereas pipe 103b is connected to channel hot water to and from a second well or well series. Solar collecting system 101 is connected to a junction which may be valved to lead either into injection well conduit 103b, or through conduit 105 which may supply in parallel the hot water faucet 106, space heating means 107, or pump or gravity-fed air conditioning means 108. When the system is solely operating on stored hot water from 103b, the water circulating through the space heating or absorption air conditioning systems 107 or 108 is returned to cool water well pipe 103a through the connecting conduit 109. It will be understood that there may be two or more pipes 103a, 103b into the underground well subsystem, all of which may take the general form of the well shown in detail with reference to FIG. 17 hereinafter. Valves and controls, which are not shown for the sake of simplicity, may comprise any suitable flow control system.

While it will be noted that high temperature storage serves to kill most harmful organisms, an alternative closed-loop collector system shown in FIG. 12, is designed to facilitate the use of antifreeze, and to control corrosion and scaling. This includes a solar collector 111, similar in form to collector 101 of FIG. 11, connected in series with a pump 110, a primary coil 112a of heat exchanger 112. The latter includes a cold water intake pipe 112b and hot water exhaust pipe 112c, which can be connected into any suitable aquifer storage and use system. For example, they are the equivalents of numbers 102 and 104 in FIG. 11.

A further alternative shown in FIG. 13, which is substituted for 106, 107 and 108 of FIG. 11, employs a tap water heat exchanger 116. This has a coil 116a, one end of which is connected to a supply of potable water 116c, and the other end of which is connected to the hot water tap 116b. Conduit 115, which replaces 105 in FIG. 11, passes hot water from the solar collector into heat exchanger 116, simultaneously with space heater 117 and absorption air-conditioner 118.

A further modification of my invention including aquifer storage systems, as described in the preceeding pages, relates to a method and system which combines aquifer storage of both hot and cold water with a heat pump so as to conserve energy and reduce costs.

FIG. 14 illustrates the conventional prior art operation of heat pumps which utilize well water at ambient subterranean temperatures. Located in the heat pump housing 125 is an air blower 126 which blows air through exhaust duct 127 which leads into the heating and/or cooling ducts of the surrounding building, and causes air to be sucked into housing 125 through intake 128.

Adjacent the air intake duct 128 is a first heat exchanger 122, opposite terminals of which are connected through a series of conduits to a closed system which includes the inner chamber 121a of a second heat exchanger 121 and a compressor 124, forming a primary circuit in which refrigerant fluid flows. The secondary circuit comprises an underground well system which includes pumping well 101 having a connecting conduit 123a, and including pumping means 120, which is connected to one terminal of the outer coil 121b of second heat exchanger 121, the other terminal of which is connected into the charging well 102 through conduit 123b. The latter well is located sufficiently far in a horizontal or vertical direction from pumping well 101 so that there is no significant circulation of heat between the two. It will be understood that wells 101 and 102 may be of a form described with reference to FIG. 17 hereinafter.

During the heating season (or cycle), the compressed refrigerant flowing in the direction of the solid arrows in the primary cycle is condensed into liquid in the heat exchanger 122 by cold air returned through duct 128. Assuming the condensed refrigerant flows in the direction indicated by the solid arrows, it passes through the inner chamber 121a of heat exchanger 121, where it evaporates, thereby cooling the relatively warm well water in the outer heat exchange coil 121b. The evaporated refrigerant fluid passes from inner chamber 121a of heat exchanger 121 to compressor 124, where it is recompressed, and the cycle is repeated.

During this same heating season or cycle, the heat pump functions to cool the well water which is pumped up from pumping well 101 at ambient temperature by pump 120 through conduit 123a and into the outer chamber 121b of heat exchanger 121, where it gives up its heat, and is returned through conduit 123b and recharging well 102 to a porous underground zone.

During the cooling season (or cycle) the flow of refrigerant in the primary circuit is reversed by conventional heat pump means, as indicated by the dotted arrows of FIG. 14. The well water from well 101 which is relatively cold with respect to condensing refrigerant is pumped up through conduit 123a to coil 121b of heat exchange 121, where it cools and condenses the refrigerant flowing into coil 121a from compressor 124. The condensed refrigerant then passes into heat exchange means 122 where it evaporates, cooling the air which is sucked from duct 128, before the air is recirculated through exhaust duct 127 by blower 126. Meanwhile the heated well water in the secondary circuit is returned to charging well 102 through conduit 123b. Since both hot and cold water are recharged into the same well, the temperature levels of both hot and cold waters are degraded and there is no possibility of utilizing the original differences in temperature levels.

In accordance with the present invention, the efficiency of the overall system is increased by utilizing the energy potentials of both the hot and cold recharge waters. This is accomplished by seasonally reversing the flow between the wells as shown in FIG. 15. In practice this reversal of flow requires installing an additional pump 220b in well 202, similar to pump 220a in well 201, whereas a recharge well, conventionally has no pumps. Although the pumps are shown aboveground for symbolic purposes, it will be understood that pumps 220a and 220b may, in fact, be part of the belowground equipments of the wells. Recharge well 202 is deepened sufficiently, if necessary to provide the required water production rate. A recharge capability is installed in the original pumping well 201; and, both wells 201 and 202 are provided with bypass and valving facilities for reversal of flow, in a manner to be described with reference to FIG. 17 hereinafter. These valving facilities may comprise the 3-way valves 228a and 228b, to provide a pump bypass for both well 201 and well 202, as shown in FIG. 15. In the system of FIG. 15, the elements indicated by the 200 numbers are substantially similar in structure and operation to similar numbered elements of the 100 series shown in FIG. 14.

As shown in FIG. 15, hot water accumulates and is seasonally stored underground around well 202; and cold water accumulates and is stored around well 201. As these hot and cold waters are withdrawn in alternate seasons, the load on the heat pump is significantly reduced. The magnitude of savings in energy consumed by the heat pump will depend upon the temperature levels of the well water used (above or below ambient subterranean temperatures); and on the type of compressors used. The success of this invention depends upon seasonal reversal of flow between wells; and any means for achieving such reversal which will be obvious to those skilled in the art may be used. Similarly, any water activated heat pump may be used.

In the event that there is significant underground movement of water in the vicinity of the wells, it is understood that said movement may be controlled by locating and pumping additional wells in the manner previously and to be subsequently described for neutralizing wells.

FIG. 16 of the drawings is a schematic showing of a practical system for supplying summer sir conditioning to a large building or building complex by means of stored aquifer water chilled by winter cold. A particular feature of this system is the use of a peripheral circle of water level monitor wells surrounded by an outer circle of control wells for controlling the hydraulic gradient in the area immediately adjacent to the pumping and injection wells for the system.

An overall system comprising three major subsystems is contemplated:

(i) A subsystem for capturing winter cold;

(ii) A subsystem for storing winter cold in the aquifer; and (iii) A subsystem for using the stored winter cold for summer air-conditioning.

In addition, in accordance with the present invention, a monitoring subsystem and a neutralizing subsystem are used in combination with the foregoing.

The manner in which an aquifer system functions with above-ground energy-capturing and use systems is disclosed, for example, in an article by R. R. Davison, W. B. Harris, and John H. Martin, entitled "Storing Sunlight Underground", Volume 5 *Chemical Technology*, December 1975, pp. 736–741, which is incorporated herein by reference.

In regard to the first major subsystem (i), there are two alternative ways to capture winter cold. One, say, which is contemplated in the system illustrated in FIG. 16, is to cool well water with near freezing water derived from a natural out-of-doors cold water source, such as an estuary, the sea, a pond, lake, river, or stream.

The storage system indicated in (ii) comprises a series of wells drilled vertically down into the underlying aquifer, which includes one or more core wells 302 for storage and retrieval of chilled water plus surrounding satellite wells 301 for return to the aquifer system of warm water which has been circulated through above-ground heat-exchangers. On the periphery of the area in which the core and satellite wells are disposed, is a circle of monitor wells, represented by 341a, 341b; and beyond them is another circle of control wells 351a, 351b. Assuming there is a substantial hydraulic gradient in the area in which the storage system is constructed, the control wells comprising 351a, which are located in the area of highest water level, may be connected through a water disposal system 357a, the output from which may either lead to control well(s) 351b in the area of lowest water level, or to a disposal system. On the other hand, the series of wells 351b may be connected through a system of conduits 357b either to receive water from well(s) 351a, or from some other auxiliary source, all for the purpose of neutralizing the natural gradient, under control of the monitor wells 341a, 341b.

It is contemplated that the aquifer storage system described with reference to FIG. 16 is located in an area, such as is characteristic, for example, of many parts of Long Island, N.Y. Below the land surface 300, in a typical such area of Long Island, or other such sites which may be useful for the purposes of the present invention, is a layer of glacial sand about 100 feet thick, extending to level 305, below which may be located a layer between, say, 30 and 100 feet thick, of gardener's clay, extending down to level 310, known as "the upper aquitard", and representing the upper surface of the aquifer. The aquifer which is confined between the levels 310 and 312, may be between 120 and 450 feet thick. The aquifer stratum between levels 310 and 312 is filled with water-previous material consisting primarily of Jameco gravel and/or Magothy sand, the former having a permeability of about 1000 to 3000 gallons per day per square foot and an estimated porosity of 30 to 35 percent, the latter having a permeability of about 400 to 1200 gallons per day per square foot, and a probable porosity of 25 to 41 percent. The transmissibity of the Jameco and Magothy layers, combined, is about 100,000 to 250,000 gallons per day per foot; and the storage coefficient is about $1 \times 10^{-4}$. The static piezometric surface of the aquifer stratum under discussion is about 5 feet below mean sea level.

A screened well in the aquifer under discussion, having a screen diameter of between 20 and 24 inches, would be expected to yield or recharge about 1500 to 3000 gallons per minute, with a draw-down of 20 to 30 feet. The mean ambient temperature of ground water pumped from such an aquifer would be 55 to 60 degrees F. A six-inch diameter well screened the entire length of the aquifer would be expected to yield at least 200 to 300 gallons per minute and could be used as an injection well at the rate of about 200 gallons per minute. If cooled de-aerated water at about 38 degrees F. is injected into a six inch diameter screened well in the aquifer under description at 200 gallons per minute for 10 days, it is estimated that the injected water would occupy a volume having the approximate shape of a slightly truncated cone of about 200 to 300 feet radius. The temperature of the injected water at the outer radius would be 50–55 degrees F.; and at the injection well, about 38 degrees F.

It is contemplated in the system described with reference to FIG. 16 that one core well 302, or preferably, a plurality of core wells, are arranged in one of the configurations shown in FIG. 19 or 20 to be discussed hereinafter.

FIG. 17 is an enlarged showing, in schematic, of the general form of the wells designated 301, 302, and 351a. In the present example, the core wells 302, and satellite wells 301, may be drilled to a diameter of, say, 2 to 3 feet, and a depth in excess of 300 feet, or until the well bottom is in contact with the lower aquitard at level 312. An eighteen-to-twenty-four inch diameter casing 323b, of, for example, stainless steel or other material resistant to heat loss and/or corrosion, is interposed axially into well 302, and into a similar position in the other wells. This casing extends only about 10 feet below the upper aquitard, being connected coaxially at its lower end to a conventional cylindrical well screen 314b, about 16 inches in diameter, which extends mearly to the bottom of the well. The casing 323b is set in place at its upper end in an annular packing 318b, the annular space 329b between screen 314b and the well wall being packed with coarse sand and gravel. A motor 319b on the surface above the well-head is connected in driving relation to a conventional centrifugal deep well pump 316b. The bottom of the well is filled with concrete grout 334b about 18 inches thick. Wells 302 are equipped with three-way valves 326b so that the well may be used for the recharge through open valve 380b and recharge line 336b; as well as pumping cycle through open valve 370b and pumping line 358b. The recharge line 336b extends below the pump in the casing. Valve 390b shuts off access to the well entirely.

An an additional feature, a small number of the wells 302 are equipped with temperature-sensing means. This may comprise a $\frac{3}{4}''$ diameter stainless steel pipe 307b which is set in place in the grout packing parallel to and between the outer wall of casing 323b and the well wall. Pipe 307b extends nearly to the bottom of a well so equipped. Spaced apart in positions near the bottom, middle, and top of the aquifer channel, in the specially equipped wells, are at least three temperature sensors 304b which may be thermocouples or thermistors of any of the forms well-known in the art. These are electrically coupled, in each case, to a read-out panel 317b which is wired and calibrated to translate the responses of the thermosensitive elements 304b to temperature in degrees Fahrenheit, or Centigrade in a manner well-known in the art.

It will be understood that the construction of satellite well(s) 301 is substantially similar to that of core wells 302. Each of wells 301 comprises a motor 319a on the surface above the well head connected in driving relation to a conventional centrifugal deep well pump 316a, and a system of bi-pass valves and pipes in the manner previously described, with reference to FIG. 17. Selected ones of the wells have temperature sensors and readout panels of the types previously described. For convenience of description, elements in wells 301 having the designating letter a are similar to like-numbered elements in wells 302 having the designating letter b.

For simplicity of description, the by-pass valves and pipes have been omitted from FIG. 16.

Wells 351a are similar in design to wells 302; but they are smaller, and need only to have about 10 to 20 feet of screen extending below the casing 353a into the aquitard. They may be placed farther apart; and they require no recharge valve and by-pass line, as with wells 301 and 302, as they are used solely for pumping.

Wells 351b are used solely for recharge; they are similar in size and design to wells 351a, but contain no pumps.

A particular feature of the invention comprises the monitor wells 341a and 341b. These are located at a distance, say 1000 feet beyond the outer ring of satellite wells, as will be discussed hereinafter, and function to indicate the changes in hydraulic gradient by constantly measuring the water level.

Referring to FIG. 18, there is shown a typical monitor well corresponding, for example, to wells 341a and 341b, FIG. 16. Referring to well 341b, the bore hole 349b has an outer diameter of, say, eight inches, extending down through the upper aquitard layer, into which hole is interposed, in coaxial relation, a three-inch diameter stainless steel casing 343b, which is secured in place by an annular packing of grout 348b. The casing 343b extends between about $\frac{1}{4}$th to half way into the aquifer, the lower end being a conventional wellpoint screen 342b. A float 344b rides on the surface of the water, rising and falling in the casing 343b, and through an electro-mechanical connection, of a type well known in the art, actuates a readout panel 347b which is calibrated in terms of the liquid level. It will be understood that monitor wells 341a and 341b, and other monitor wells, are substantially identical in form to that shown in FIG. 18, except that where desired to monitor temperatures, and/or to sample water at different levels, the length of the screen may extend to the bottom of the aquifer.

Particular features of this invention are the alternative well configurations shown in FIGS. 19 and 20, in which O represents the central cold water injection and pumping wells 302 (in which the average mean temperature of the water is 34° F.)

In FIG. 19, □ represents the satellite rings of pumping and injection wells 301, (in which the water has an average mean temperature of 45° F.); △ represents the peripheral ring of monitor wells, and ● represents the outer ring of wells for controlling the hydraulic gradient. In FIG. 20, (X) represents multi-use wells. The functioning of these systems of shells surrounding the core wells, in controlling the temperature and hydraulic gradients will be explained presently.

Referring again to FIG. 16, the first above-ground subsystem comprises the system for employing winter cold to cool water to be stored in the aquifer system. The block diagram 338 represents any source of water naturally exposed to cold winter air, such as water from a lake, or estuary, for example. When valves 333a and 334a are opened, the cold water, which may be at a near freezing temperature of about 34° F., for fresh water lakes, or 28° F. in ice-covered estuaries full of ocean water, is pumped through heat exchanger 331 by means of pump 336, and back to the source 338. Alternative to the use of cold natural water, water for the purposes of the collecting system of the present invention may be chilled by air passing through cooling towers; or by fluid from an internal refrigeration system.

In either case, during the winter, water is pumped up by motor 319a and pump 316a through one or more of the satellite wells 301, valves 350a and 360b being open, and valves 360a and 350b being closed. In this operation, it will be assumed that the satellite well(s) have the proper valves open for pumping, and the core well(s) have the proper valves open for recharging through the by-pass around the pump into the well, although for simplicity these valve connections are not shown on FIG. 16, but only on the enlarged schematic well drawing, FIG. 17, which as previously stated, is typical of wells 301 and 302. The water pumped up from well 301 passes through the secondary coil 331a of heat exchanger 331, where it is cooled from the aquifer temperature of 45° F. to the heat storage temperature of 38° F. The chilled water then passes through conduit 313 and into pump by-pass conduit 336b (FIG. 17) where the water is injected into one or more of the core wells 302, where it is stored in the aquifer between the aquitard barriers 310 and 312.

During the summer, valves 333a and 334a are closed, cutting off the cold fluid supply subsystem completely.

Valves 350a and 360b are closed; and valves 360a and 350b are opened. In this operation, the valves in the wells are reversed, so that the core wells 302 have the proper valves open for pumping, and the satellite wells 301 have the proper valves open for recharging through the by-pass conduits into the well(s). (See FIG. 17.) Water is pumped up from the cold water core well(s) 302 by motor 319b, and pumps 316b through well conduits represented by conduit 323b, three-way valve 326b, and conduit 358b (FIG. 17), and through the secondary coil 321b of heat-exchanger 321, the warmed water returning through the open valve and by-pass pipes into satellite well(s) 301. Warm water from building 322 passes through 327 to heat-exchanger 321, where it is cooled by the chilled aquifer water passing through coil 321b, the cooled water ultimately being pumped back into building 322 by pump 326, conventional chilled water-to-air heat-exchange being accomplished in the buildings.

Referring to the simpler well system shown in FIG. 19, it will be seen that eight cold water core wells (O) which are substantially identical to well 302 disclosed with reference to FIGS. 16 and 17, are symmetrically spaced apart around a circle having a radius of 500 feet, the separations between adjacent wells being 400 feet. Surrounding these is another circle of eight symmetrically spaced satellite wells (□) being spaced 750 feet apart. Two wells on radii 90° apart in each circle are provided with temperature sensors of the type disclosed in FIG. 17. Eight monitor wells 343a, 343b, (Δ), such as shown in FIG. 18, are symmetrically arranged in a third concentric circle having a radius of 2000 feet, the spacings between adjacent wells being 1500 feet. At a further distance beyond the circle of monitor wells are control wells 351a, 351b (O). The latter are respectively located on the upstream and downstream extremities of the hydraulic gradient, about 3000 feet out from the center as measured along the radii. These wells, which are substantially of the form shown in FIG. 17, but smaller, are either interconnected, or are respectively connected to a water source on the downstream side and a water disposal system on the upstream side, and function in the manner indicated with reference to FIG. 10 to compensate for changes in the hydraulic gradient by injecting or withdrawing water where necessary to approximate a zero gradient.

Referring to FIG. 16, a system 357a, connected to well 351a, in the high-water level area, provides for disposal of water pumped up from the well; whereas system 357b connected to well 351b, in the low-water level area is connected to a water source. 357a and 357b may be independent systems, or they may alternatively be connected together, so that the excess water from 357a is siphoned or pumped into 357b to raise the water level, and reduce the gradient. Operation of the water source or disposal systems 357a and 357b of control wells 351a and 351b may be controlled to open and close valves electronically, for example, by solenoid means well known in the art, which are actuated by relay means controlled by the respective liquid indicators 347a, 347b of the monitor wells 341a, 341b.

A more complex well arrangement is disclosed in FIG. 20 of the drawings. In this arrangement, as shown, the code indicating the types of wells are the same as in FIG. 19, except that wells marked with code (X) have multiple uses as both pumping and injection wells, for both chilled and warm water in both summer and winter cycles.

The core wells (O) are used only for the pumping and injection of chilled water; and the circle D wells (□) are used only for the pumping and injection of warm water. It will be seen that one central cold-water core well 302 (O), is surrounded by a circle (A) of eight multi-use wells (X) at a distance of 500 feet from the center, adjacent wells being separated at distances of about 400 feet around the circumference of the circle. A second circle (B) of 16 multiple-use wells (X) surrounds and is concentric with the first circle (A) and central core wells (O), at a distance of 1000 feet from the center, and with circumferential separations of about 400 feet between adjacent wells.

Surrounding these concentric circles is a third circle (C), of 24 multi-use wells (X), having a radius of 1500 feet and separations of about 400 feet between adjacent wells. Surrounding the third circle at a radius of 1800 feet from the center is a fourth circle (D) of 32 warm water injection wells 301 (□), having separations of about 350 feet between adjacent wells. In the first four circles, A–D, it is contemplated that every fifth well will be equipped with temperature sensing means 304b, as shown in FIG. 17. Beyond the fourth circle, at a distance of 2000 feet from the center is located a surrounding circle of 8 monitor wells 341a, 341b (Δ), having separations exceeding 1500 feet between adjacent wells, designated E.

Depending on the hydraulic gradient, a plurality of control wells 351a, 351b, (●) are located at the upstream and downstream ends of the well area at distances of, say, 500 feet beyond the nearest monitor well. As previously discussed, these may be connected by an electronic system to monitor wells, 341a, 341b (Δ), responsive to detection of a predetermined hydraulic gradient to open valves to either bring in water from an independent source to well 351b if the water level is low, or to connect in pumping means to dissipate water from well 351a if the water level is high, such as indicated, for example, in FIG. 10. As previously indicated, this can be accomplished by interconnecting wells 351a and 351b.

In the well system disclosed in FIG. 20, cold water, which originates by pumping from well circle (A), is injected during the winter, first into the central storage core well 302, circle (O), passing out through the aquifer towards multi-use storage wells (X). When a drop in temperature is detected in well circle (A), pumping is shifted from circle (A) to the second circle (B) of multi-use storage wells (X). Cold water injection is continued into the central well (O) until the temperature in the circle (A) wells reaches the injection temperature, after which injection is begun in circle (A) wells, and stopped in central well (O). Similarly, when a drop in the temperature is detected in well circle (B), pumping is shifted to the third well circle (C); and when the circle (B) wells reach the injection temperature, injection is shifted to the circle (B) wells. Similar shifts in pumping and recharge are made until all pumping is done from the outer circle (D) of the satellite wells, and the storage volume is filled with cold water. At this point, all multi-use wells (X) have become cold water storage wells 302.

During the summer cycle, the pumping and injection sequence is reversed. Cold water is first pumped from the outer circle (C) of multi-use wells (X); and warm water is returned by injection into the outer circle (D) of satellite wells □. When warm water is detected in the circle (C) wells, pumping is shifted to circle (B) multi-use wells, and stopped in circle (C) wells, and so on, until the central well (O) is reached, and cold water stored in the aquifer is all used up, as indicated by a reverse in temperature at cold well (O). It is seen that this system tends to isolate the cold water wells from the hot water wells, and conserve losses of heat or cold. A second very important advantage of this system is that pumping draw-downs and injection heads are greatly reduced, resulting in significantly lower pump operation costs. A third advantage is that chilled water is prevented from escaping into the surroundings at ambient temperature.

Although the system just described has been adapted to the storage of winter cold for summer air-conditioning, it will be apparent that the same principles can be applied, in reverse, to the storage of solar heat, or heat from various other sources, such as the exhaust from a steam generator, for winter heating. A system illustrating such application of the principles of the present invention is shown in FIG. 21 of the drawings. Unless otherwise indicated, it will be understood that elements designated by numbers of the 400 series of FIG. 21 correspond to and are substantially similar to elements in the 300 series of FIG. 16, with the exception that there are no deep water pumps required in the wells for this system because of the shallow aquifers.

At the site contemplated for the system of FIG. 21, glacial sand and gravel extends to a level 412, about 180 feet between ground level 400. The water passing through the sand and gravel aquifer rises to level 410 which is only about ten feet below the surface 400. Between levels 412 and 415 is a layer of clay about 10 to 20 feet thick, which functions as an aquitard at the bottom of the sand and gravel aquifer. Between levels 415 and 417, the latter representing bedrock, is an artesian aquifer.

The system of wells in the arrangement of FIG. 21 comprises one or more central or core wells 402 for the storage of hot water, and a plurality of surrounding satellite wells 401 for recharging of warm water which has given up part of its heat into the above-ground system. It will be understood that the core and satellite wells 402 and 401 extend nearly to the bottom of the sand and gravel aquifer between levels 410 and 412, and are similar in form to corresponding wells shown in FIGS. 16 and 17, with the exception that no deep water pumps are required. Also, the arrangement of these wells may be similar to either of the patterns disclosed in FIGS. 19 and 20, with the core wells 402 (O) in a central configuration of one or more circles, surrounded by one or more shells of multi-use wells (X) and satellite wells (□). Every fifth well may include temperature sensing means as shown in FIG. 17.

In addition, as described with reference to FIG. 16, a plurality of monitor wells 441a, 441b (△) of the general type and disposition described with reference to FIG. 16, which measure the water level and temperature, are located in a circle beyond the outer circle of satellite wells. Beyond these, is a plurality of control wells, 451a, 451b (●) which function to control the hydraulic gradient in the manner described with reference to FIGS. 10 and 16. As previously described, it is contemplated that the operation of control wells 451a, 451b, respectively, to dispose of water from the high water area, or add water to the low water area, can be controlled by opening and closing valves electronically by means of the electrical output from monitor wells 441a, 441b, using technology which is well known in the art. Alternatively, control wells 451a and 451b can be connected together, as previously discussed, to pump or siphon water from the high level area to the low level area to neutralize the hydraulic gradient.

Referring again to FIG. 21, it is anticipated that exhaust steam from a system of electrical generators 422, which conventionally passes out through the existing steam vent stack 434, will first be diverted through a heat-exchanger 431, which may assume the form known in the art as the disc-and-donut type. During the summer, water pumped up from satellite well 401 by means of pump 420b, assuming valve 460b is open, and 450b is closed, is passed downward through the discs-and-donut section 431a of heat-exchanger 431, where it is heated by the generated steam. Assuming valve 460a is open, and 450a is closed, this heated water passed through well head 419a and conduit 423a into one of wells 402, where it is stored as hot water. In winter valve 460a is closed, and 450a is opened permitting hot water from one of wells 402 to be pumped by pump 420a through the coil 421a of the shell-and-tube or water-to-air heat exchanger 421. This serves to heat up air or water from the system of buildings 422 which passes through the primary circuit of heat exchanger 421, and is returned into the building heating system by pump or blower 426. The water from the secondary coil 421a of heat exchanger 421 passes through open valve 450b and assuming valve 460b is closed, is passed through well-head 419b and conduit 423b for dissipation in one or more satellite wells 401.

It is noteworthy that deep well pumps are not used in wells 402 and 401 because the watertable is close enough to the land surface that conventional suction pumps located at ground level may be used. Because hot water will be close to the surface, in order to avoid excessive heat loss, heat insulating means of the general form shown and described with reference to FIGS. 8 and 9, can be employed.

A salient feature of the present invention is the space relationship between the core wells and the satellite wells. This is designed to control the thermal and hydraulic gradients so that when all of the water to be stored has been injected into the core wells, the stored thermal energy (or cold) of the injected water is contained essentially within an area A whose perimeter is defined by the outermost satellite wells. This well-field area A is computed as follows.

(1) $A = V/t$ Where V is the volume of the storage area; and t is the average thickness of the storage volume, which may be the average thickness of the aquifer in the storage area.

The storage volume V is a function of the specific heat capacity $c_v$ of the mineral components of the aquifer as well as the specific heat capacity $c_v$ of the water. The relative contribution of minerals and water is a function of the porosity of the aquifer.

(2) $V = (Q/c_v)_{(Ave)}$ Where Q represents the stored heat energy, and $c_v(Ave)$ represents the average specific heat of the storage area, at constant volume.

$$c_v(Ave) = \frac{\% \text{ Porosity of the aquifer}}{100} \times c_v \text{ of } H_2O + \quad (3)$$

$$\frac{1 - \% \text{ Porosity}}{100} \times c_v \text{ of solids in the storage area.}$$

The volume V should be corrected upward to allow for a thermal diffusion zone of up to about 40 feet beyond the verticle perimeter of the volume.

In the simplest cases, assuming the thickness of the storage zone to be substantially uniform, the area A to be enclosed peripherally by satellite wells would be determined by dividing the corrected volume by the aquifer thickness. In other, more complex cases, in which the thickness of the storage area varies substantially, the area A can be computed by well-known solid geometric procedures applied to the storage zone.

The dimensions of the aquifer volume which will contain a full season storage requirement of hot or chilled water is important for several reasons.
1. It is used in determining the well field design:
    a. Number of wells-assuming an isotropic aquifer; the vertical thickness of the aquifer relates linearly to the rate at which a given well can supply water.
    b. Well spacing-all wells must fit within the horizontal cross section of the storage volume.
2. It effects heat loss:
    a. By conduction-into geologic formations above and below the storage volume.
    b. By diffusion-type mixing from the vertical periphery of the storage volume. Conduction losses from the vertical periphery will most likely be minor by comparison to the diffusion losses.
    c. Leakage losses-by flow of water out of the storage volume across any peripheral surfaces (expected to be small). Thick clay layers above and below the aquifer should prevent vertical leakage. If any significant horizontal flow is found in the aquifer, it is planned to neutralize the flow with additional wells which will produce zero hydraulic gradient across the storage volume.
3. It determines how much land surface area must be available for wells.

In summary, it will be understood, that the aquifer storage system of my invention, including a hydraulically controlled gradient, comprises any overall method and system, made up of at least three subsystems, as follows:

I. At least 1 underground thermal storage subsystem.
    A. A hot water storage facility, and/or
    B. A chilled water storage facility.
II. At least 2 above-ground subsystems, at least one from each of the catagories A and B below, illustrated but not limited by six examples in each catagory.
    A. One or more thermal supply subsystems.
        1. A collection system for solar heat.
        2. A system for providing hot water from off-peak utilities, including steam, hot water, electricity, gas, nuclear, and hydroelectric supplies.
        3. Any waste heat system, including stack gases, industrial waste heat and disposal of domestic wastes.
        4. Geothermal energy, comprising steam and/or hot water.
        5. Chilled water subsystems.
            a. Cold water supplied from naturally winter-chilled sources including estuaries, oceans, rivers, lakes, streams, and ponds on roofs, backyards, etc. municipal and other supply systems.
            b. Cold water from night-time cooling by circulation through solar collectors, or insulated roof-top ponds, etc.
            c. Cold water using artificial snow-making technology.
            d. Cold water made by blowing winter air through cooling towers, dry coolers, or submerged combuster-type heat exchangers.
            e. From conventional refrigeration types.
        6. Mobile units to convert oil, gas, coal and other fuels, or electicity into thermal energy to make hot or cold water at various storage sites.
    B. One or more user subsystems.
        1. To make hot water.
        2. For space heating.
        3. For stored hot water-fired air conditioning.
        4. For air conditioning using stored chilled water.
        5. For making ice with sea or salt water (freezing points below 32° F.) stored (below 32° F.
        6. For power (electric or mechanical) generation using stored hot water firing and stored chilled water condensers.

As seen from the drawings and specification hereinbefore, my invention involves many features and applications which can be summarized as follows:

A. One specific application of the system of my invention is to solar heating and cooling of buildings. In this application my invention has the following advantages over the art:
    a. It eliminates the need for auxiliary heating systems, thereby reducing the investment required for such auxiliary heating systems, which may cost of the order of several thousand dollars for typical homes. It also eliminates yearly operating and fuel costs for the auxiliary system.
    b. My invention also reduces overall investment costs by making it unnecessary to employ many of the heat exchangers required by other systems.

B. A second specific application of my invention is to store off-peak energy from power or gas utilities. In this case the energy is stored thermally in the form of hot water. The hot water may be produced in the power generation cycle or it may be produced in a seperate operation by contacting water with steam or electric heat or with a gas combustion system. The contacting may be direct or indirect at either the utility or user site and can even be by injection of steam into the aquifer. Alternatively water from conventional refrigeration systems, operated during off-peak periods, can be stored.

C. A third specific application of my invention is to store waste heat from any suitable source such as industrial processes and recovery of heat from combustion gases or cold from vaporization of liquified gases such as natural gas.

It is not intended that my invention should be limited to the specific structures or combinations of structures described by way of illustration, to the exclusion of variations which will be obvious to engineers and scientists skilled in the phenomena involved. For example, the temperature of the water stored may be increased above the normal atmospheric boiling point of water by working in brackish and salt water aquifers and by using confined aquifers at appropriate depths below the water table. In the latter case, the pressure of the depth of water above the aquifer raises the boiling point and prevents the release of water vapor. Also, in this latter case a mixture of steam and hot water could be withdrawn from the well or released in any appropriate manner at the surface of the ground so that steam could be separated and used instead of hot water. Further the resulting water can be reheated under pressure and recharged to storage.

It will also be apparent that cold water may be obtained in any convenient manner including circulation through solar channels at night, spraying water into winter air, cooling towers and dry coolers, and drawing water from melting snow cold rains and near freezing lakes or streams including bodies of salt water. In the latter case brine may be stored at a low enough temperature to be used for ice making.

As an economical alternative, cold water from lakes, reservoirs or municipal supplies can be charged directly into the core wells (such as 301, FIG. 16) in the winter. In summer after use for cooling purposes, as set forth in the present invention, this water can be returned directly to the city water mains and/or stored in satellite wells, such as 301. Since the period of peak water consumption is in the summer, this has obvious advantages. For example, the chilled water used for cooling, and other purposes, in the summer at John F. Kennedy Airport is comparable to the water supplied to a large area of the Borough of Queens. The dual use of this water would constitute a substantial saving to New York City.

In addition to or in substitution for the illustrative configurations heretofor shown, it will be understood that a type of system can be used in which the colder water is stored at the bottom (or hot water is stored at the top) of radial collector wells, in which the lower portion of the well interposed into the aquifer is equipped with horizontal radially directed screen pipes. A similar configuration of radially directed screen pipes can also be used in the upper portion of the aquifer for storing the warmer water (or in the lower portion for storing cooler water). It has been found, further, that in order to avoid excessive draw-down and injection heads in system of the types previously described, one might use a single well, or a system of wells, of the general type disclosed and described with reference to FIG. 3 which are individually screened, as a minimum at the top and bottom of the storage zone. As shown in FIG. 3, hereinbefore, multiport inner pipes are used for hot water and for cool water, so that the hot water is directed to the highest level, and the cold water, to the lowest level, thereby not only accomplishing greater thermal efficiency, as previously discussed with reference to FIG. 3, but resulting in the ultimate in reduction of injection and pumping heads.

It will be understood that the present invention will be limited only by the scope of the appended claims, and not by the details of any of the specific systems described herein for illustrative purposes only.

What is claimed is:

1. A system for storing heat or cold in material aquifers in the form of hot or cold water, comprising in combination:
    a first subsystem for heat or cold utilization disposed above ground-water level including a first set of conduits with circulating heat-transfer fluid;
    a second subsystem including a second set of conduits connected to means in heat-transfer relation with said first subsystem;
    said second subsystem including at one terminal a core well configuration extending substantially vertically down from ground level to an aquifer stratum disposed below said ground level for storing hot or cold water, and connected at the other terminal to means for returning at a point spaced apart from said core well configuration, water derived from said means in heat transfer with said first subsystem;
    and means for at least partially controlling the thermal and hydraulic gradients surrounding said core well configuration.

2. A system in accordance with claim 1 wherein said means in heat transfer relation with said first subsystem comprises a heat-exchanger.

3. The combination in accordance with claim 1 wherein said means for at least partially controlling the thermal and hydraulic gradients comprises at least one configuration of satellite and control wells spaced apart from and in fluid transfer relationship to said core well configuration.

4. A system in accordance with claim 3 wherein said means for at least partially controlling the thermal and hydraulic gradients comprises a plurality of satellite wells in fluid transfer relation to said core well configuration and spaced apart in at least one array approximately centered on said core well configuration.

5. A system in accordance with claim 4 wherein said means for at least partially controlling the thermal and hydraulic gradients comprises a plurality of multi-use wells spaced apart between said satellite wells and said core well configuration in a plurality of substantially concentric arrays approximately centered on said core well configuration and in fluid transfer relation from the outermost array of said satellite wells through successive inner arrays to said core well configuration.

6. A system in accordance with claim 7 wherein said means for at least partially controlling said thermal and hydraulic gradients comprises a space relationship between said satellite wells and said core well configuration such that when all of the water to be stored has been injected into said core wells, the thermal energy of said injected water is contained within the perimeter of a storage area A; wherein said storage area A is defined by the equation:
    $A = V/t$ where $V =$ the volume of the storage area, and $t =$ the average thickness of the storage area;
    in which the storage volume V is computed from the following equation:

$$V = Q/c_{v(Ave.)}$$

Where Q = the stored heat energy;

Average Specific heat (at constant volume) = $c_v$(Ave.) =

$$\frac{\% \text{ porosity of aquifer}}{100} \times c_v \text{ of } H_2O + \frac{1 - \% \text{ porosity}}{100} \times c_v$$

of solids in storage Vol. V.

7. The combination in accordance with claim 4 wherein beyond the outermost array of satellite wells surrounding said core well configuration are one or more wells constructed to monitor the hydraulic gradient of the area surrounding said core well configuration.

8. The combination in accordance with claim 1 wherein said means for at least partially controlling the thermal and/or hydraulic gradients comprises recharge water interposed from another source for neutralizing said gradients.

9. A system in accordance with claim 3 wherein said means for at least partially controlling the thermal and hydraulic gradients comprises at least one control well in fluid transfer relation with said core well configuration, and disposed in an area of maximum or minimum hydraulic gradient for modifying said gradient by changing the water level in said area.

10. A system in accordance with claim 9 which comprises a plurality of control wells in fluid transfer relation to said core well configuration, said control wells being disposed in pairs spaced apart on opposite sides of said core well configuration in the areas of maximum and minimum hydraulic gradient adjacent thereto.

11. The combination in accordance with claim 1 wherein said means for returning said water at a point spaced apart from said core well configuration comprises a second well configuration substantially thermally and hydraulically isolated underground from said core well configuration, said second well configuration including means for at least partially controlling the thermal and hydraulic gradients surrounding said second well configuration.

12. The combination in accordance with any one of claims 1 through 5, 6 through 11 wherein said first subsystem comprises fluid flowing in a closed circuit including a heat pump comprising condensing means and evaporating means; and means including a system of reversible valves for reversing the flow of fluid in said circuit and interchanging the functions of said condensing means and said evaporating means.

13. A system in accordance with any one of claims 1 through 5, 6 through 11 which includes:
a third subsystem disposed above ground water level for collecting heat or cold, said third subsystem including a third set of conduits connected to means in heat-transfer relation to said second subsystem.

14. A system in accordance with claim 13 wherein said third subsystem comprises cooling means including a cooling tower or dry cooler exposed to the atmosphere for cooling said circulating fluid.

15. A system in accordance with claim 13 wherein a said third subsystem comprises cooling means including winter chilled water from a large natural body of water.

16. A system in accordance with claim 13 wherein said third subsystem comprises cooling means linked to conventional refrigeration means in off-peak hours.

17. A system for storing heat or cold in natural aquifers in the form of hot or cold water, comprising in combination:
a first subsystem for heat or cold utilization disposed above ground-water level including a first set of conduits with circulating heat-transfer fluid;
a second subsystem including a second set of conduits connected to means in heat-transfer relation with said first subsystem;
said second subsystem including at one terminal a core well configuration extending substantially vertically down from ground level to an aquifer stratum disposed below said ground level, for storing hot or cold water, and connected at the other terminal to means for recharging into the ground at a point spaced apart from said core well configuration, water derived from said means in heat-transfer with said first subsystem; and
means for at least partially controlling the hydraulic gradients surrounding said core well configuration.

18. A system for storing heat or cold in natural aquifers in the form of hot or cold water, comprising in combination:
a first subsystem for heat or cold utilization disposed above ground-water level including a first set of conduits with circulating heat-transfer fluid;
a second subsystem including a second set of conduits connected to means in heat-transfer relation with said first subsystem;
said second subsystem including at one terminal a core well configuration extending substantially vertically down from ground level to an aquifer stratum disposed below said ground level, for storing hot or cold water, and connected at the other terminal to means for recharging into the ground at a point spaced apart from said core well configuration, water derived from said means in heat-transfer with said first subsystem; and
means for at least partially controlling the thermal gradients surrounding said core well configuration.

* * * * *